United States Patent [19]

Klink

[11] Patent Number: 5,706,277
[45] Date of Patent: Jan. 6, 1998

[54] METHOD FOR CHANGING-OVER TO STANDBY FOR A TRANSMISSION DEVICE FOR THE BIDIRECTIONAL TRANSMISSION OF DIGITAL SIGNALS AND ARRANGEMENT FOR CARRYING OUT THE METHOD

[75] Inventor: Joachim Klink, München, Germany

[73] Assignee: Siemens Aktiengesellschaft, Munich, Germany

[21] Appl. No.: 553,567

[22] PCT Filed: May 10, 1994

[86] PCT No.: PCT/EP94/01505

§ 371 Date: Nov. 27, 1995

§ 102(e) Date: Nov. 27, 1995

[87] PCT Pub. No.: WO94/28646

PCT Pub. Date: Dec. 8, 1994

[30] Foreign Application Priority Data

May 28, 1993 [EP] European Pat. Off. ............ 93108706

[51] Int. Cl.[6] .................................................. H04Q 11/00
[52] U.S. Cl. ........................ 370/220; 375/228; 371/20.1; 395/182.02
[58] Field of Search ........................... 375/260, 257; 370/217, 220, 225, 226, 227; 379/2; 371/20.1, 20.6, 20.2; 340/827, 825.01; 395/182.02

[56] References Cited

U.S. PATENT DOCUMENTS

| 4,905,222 | 2/1990 | Seeger et al. | 370/220 |
| 5,014,264 | 5/1991 | Nagler et al. | 370/220 |

FOREIGN PATENT DOCUMENTS

| 216096 A2 | 4/1987 | European Pat. Off. |
| 0 483 790 | 6/1992 | European Pat. Off. |
| 0 507 379 | 10/1992 | European Pat. Off. |
| 0 533 167 | 3/1993 | European Pat. Off. |
| 2 233 851 | 1/1991 | United Kingdom. |

*Primary Examiner*—Wellington Chin
*Assistant Examiner*—Jean B. Corrielus
*Attorney, Agent, or Firm*—Hill, Steadman & Simpson

[57] ABSTRACT

A method is provided for changing over to a standby link for a transmission device for the bidirectional transmission of digital signals. To implement the bidirectional changeover to the standby link as quickly as possible, control information is transmitted, as a rule, in only one step between the terminals (1, 3). In the event of a mismatch between information on the state of the respective local switching device formed locally and received (K2) from the distant station, the local receiving device (14, 34) is connected to the operating link (21) for eliminating the switching fault.

10 Claims, 3 Drawing Sheets

METHOD FOR CHANGING-OVER TO STANDBY FOR A TRANSMISSION DEVICE FOR THE BIDIRECTIONAL TRANSMISSION OF DIGITAL SIGNALS AND ARRANGEMENT FOR CARRYING OUT THE METHOD

BACKGROUND OF THE INVENTION

The invention relates to a method for changing-over to standby for a transmission device for the bidirectional transmission of digital signals and to an arrangement for carrying out the method.

Such a method and such a changeover device are already known from CCITT Recommendation G.783, Geneva 1990, ANNEX A.

The known changeover device is provided for a transmission device for the bidirectional transmission of digital signals, in which two terminals are connected to one another via an operating link and a standby link. The two terminals in each case contain a monitoring device for finding transmission faults. A switching device, which can be controlled by the monitoring device, connects a receiving device to the operating link in a first switching state and to the standby link in a second switching state. Between the control devices of the two terminals, control information of the first and second type is exchanged. The switching device is in each case controlled by the local monitoring device in dependence on local control criteria and control criteria contained in control information received from the distant station.

One of the methods according to CCITT Recommendation G.783, Annex A, relates to transmission devices of the synchronous digital hierarchy SDH and uses the K1 and K2 bytes of the section overhead for coordinating the switching process bidirectionally between the two terminals. To conclude a switching process, altered K1 and/or K2 bytes must be transmitted three times in succession between the two terminals.

Furthermore, a variant of a bidirectional switch-over which only provides for K1 and K2 bytes to be exchanged twice is described in the said recommendation.

From published European patent application 0 533 167, an optical communication system with circuit switching is known. From published European patent application 0 507 379, a protective device for an optical transmission facility is known.

SUMMARY OF THE INVENTION

It is the object of the invention to develop the method and, respectively, the changeover device of the type initially mentioned, in such a manner that the bidirectional changing over to the standby link takes place as rapidly as possible. In particular, the changeover device should be suitable for line equipment of the synchronous digital hierarchy with a 1+1 or 1:1 arrangement, the same information signal being transmitted from one terminal to the other via the operating link and the standby link in a 1+1 arrangement and via the operating link or the standby link in a 1:1 arrangement.

In the known switch-over, a sequence of a number of steps can be used for ensuring, that the switching devices of both transmission directions correspond to one another after the sequence of steps has ended.

The invention is based on the finding that the average duration of the bidirectional changeover to standby can be considerably shortened by a bidirectional switch-over with only a single information transmission being provided in which in exceptional cases switching faults can occur and such a switching fault, if necessary, being corrected in a correction phase which can also be implemented in a simple manner.

According to the invention, the switching request with the highest priority of the local switching requests and of the switching requests received from the remote distant station is in each case selected in both terminals. Local and received switching requests are dealt with on an equal basis. The switching request thus selected determines the controlling of the switching device directly, that is to say without further exchange of information with the distant station.

The measures according to the invention result in the advantage that, as a rule, the operation of the switching devices in the two terminals can take place with only a single transmission of the control information between the two terminals. The changeover process is thus normally concluded very rapidly for both transmission directions of the bidirectional information transmission.

When a transmission fault is found at the receiving end in one of the two terminals, this terminal immediately switches over, informs the distant station with the aid of the control information of the first and second type and this distant station follows.

In this arrangement, it is accepted deliberately that switching faults can occur in certain exceptional cases, in which the switch positions are different in both terminals. This is the case, for example, when local changeover requests of the same priority occur quasi simultaneously but for different links in both terminals.

These switching faults are detected and corrected in a simple manner. The positions of the switching devices in the two terminals are then automatically matched to one another in a simple and rapid manner.

In general terms the present invention is a method for changeover to standby for a transmission device for the bidirectional transmission of digital signals in which two terminals of a transmission section each contain a transmitting device and are connected to one another via an operating link and a standby link. Each terminal contains a monitoring device for detecting transmission faults, a switching device, which is controllable by the monitoring device, to connect a receiving device to the operating link in a first switching state and to the standby link in a second switching state. Control information of the first and second types are exchangeable between the monitoring devices of the two terminals. The control information of the first type contains an information item on the local control criteria. Each switching device is controllable by control signals by the local monitoring device in dependence on local control criteria and on control criteria contained in the received control information such that digital signals are optionally passed to the receiving device via the operating link or the standby link. Both the local control criteria and the control criteria of the remote terminal contained in the received control information of the first type are treated as equivalent switching requests by the monitoring device when the control signals are formed. The switching device is only operated in accordance with the switching request having the highest priority in that the control information of the second type contains an information item on the state of the local switching device and in that the local switching device, is placed in its first state by the monitoring device when there is a mismatch between locally formed control information and received control information of the second type and if the local switching device is in the second state.

In general terms the present invention is also a changeover device for a transmission device for the bidirectional transmission of digital signals between two terminals of a transmission section, each of which contain a transmitting device and are connected to one another via an operating link and a standby link. Each terminal has a monitoring device for detecting transmission faults, and a switching device, which can be controlled by the monitoring device, connecting a receiving device to the operating link in a first switching state and to the standby link in a second switching state. Control information of the first and second types are exchangeable between the monitoring devices of the two terminals. The control information of the first type contains an information item on the local control criteria. Each switching device is controllable by control signals by the local monitoring device in dependence on local control criteria and on control criteria contained in the received control information such that the digital signals pass optionally via the operating link or the standby link to the receiving device. The monitoring device is designed such that both the local control criteria and the control criteria of the remote terminal contained in the received control information of the first type are treated as equivalent switching requests when the control signals are formed. The switching device is only operated in accordance with the switching request having the highest priority. The control information of the second type contains an information item on the state of the local switching device. The monitoring device, in the case of a mismatch between locally formed control information and received control information of the second type and with the local switching device being in its second state, places the local switching device in the first state.

In the case of a 1+1 switch-over, in which the transmitting device delivers the digital signal to be transmitted continuously to the operating link and to the standby link, the switch-over device at the receiving end is adequate.

In the case of a 1:1 switch-over, in which the information signal is transmitted to the receiving device via the operating link or the standby link, a further switching device optionally connects the standby link to the output of the transmitting device. The two switching devices of one and the same operating station are in each case jointly controlled.

The further switching device is designed such that the standby link is optionally connected to the output of the transmitting device or to the output of a further transmitting device. The input of a further receiving device in each case can be optionally connected to the standby link via a further switching device.

The measures make it possible to use the standby link for transmitting additional information signals when it is not needed as replacement for the operating link 21.

The transmission device for the bidirectional transmission of digital signals in each case contains a device for the periodic sending-out of the control information of the first and second types at the transmitting end and a device for converting the periodically received control information into continuous signals at the receiving end.

The monitoring device, in the case of a mismatch between locally formed control information and received control information of the second type and due to the switching device being in its second state, outputs a message on the detected switching fault. After the switching fault has been eliminated, it maintains the message for as long as the mismatch continues to exist.

The mismatch between locally formed control information and received control information of the second type is only detected after a predetermined waiting time has elapsed.

The transmission device for the bidirectional transmission of digital signals is a transmission device of the synchronous digital hierarchy. The control information of the first type can be transmitted as K1 byte and the control information of the second type can be transmitted as K2 byte of the overhead.

The first four bits of the K1 byte contain an information item on the state of the trans-mission link, the operating state of the changeover device or external control commands, and the last four bits contain an information item on the associated link.

The first four bits of the K2 byte contain an information item on the state of the switching device or the switching devices, respectively.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
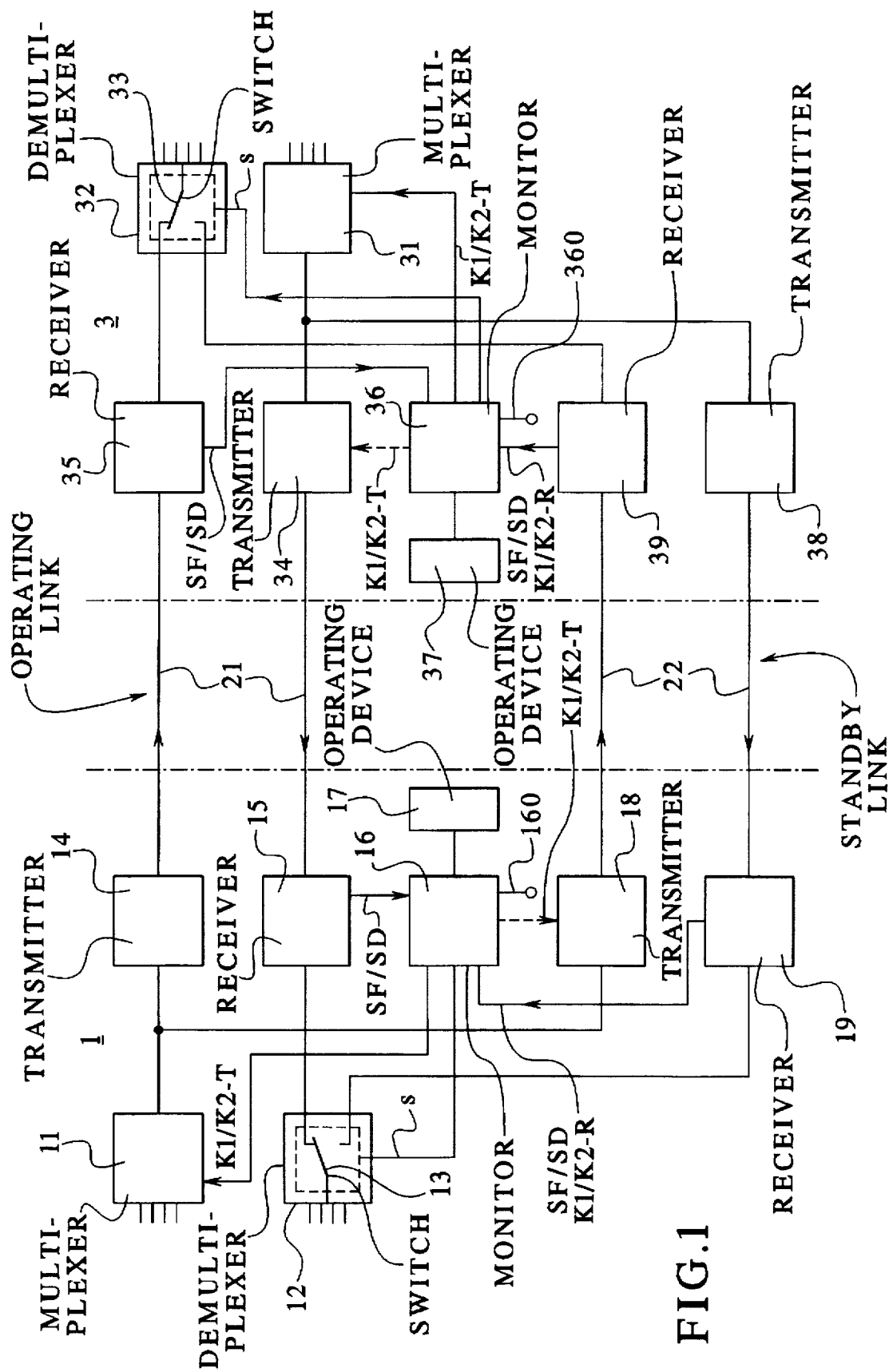
FIG. 1 shows a changeover device with an operating link and a standby link for 1+1 switch-over.

FIG. 1 shows a changeover device for a transmission device for the bidirectional transmission of digital signals.

The two terminals 1 and 3 of a transmission section in each case contain the multiplexer 11 and 31 as transmitting device and the demultiplexer 12 and 32, respectively, as receiving device. The terminals 1 and 3 are connected to one another via the operating link 21 and the standby link 22.

The multiplexer 11, as data source or, respectively, transmitting device continuously outputs the digital signals to be transmitted both to the optical transmitter 14 of the operating link 21 and to the optical transmitter 18 of the standby link 22.

The change-over switch 13 contained in the demultiplexer 12 connects the other switching means of the demultiplexer 12 which form a data sink or, respectively, receiving device, optionally to the optical receiver 15 of the operating link 21 or to the optical receiver 19 of the standby link 22.

The terminals 1 and 3 also in each case contain a central monitoring device 16 and, respectively, 36. The central monitoring device 16 is connected to the multiplexer 11 and the optical receivers 15 and 19, receives control information from the operating device 17, if necessary, and, in turn, controls the change-over switch 13 with the aid of control signals s.

The central monitoring device 16 receives information on the received K1 and, respectively K2 bytes (K1/K2-R) from the optical receiver 19 of the standby link 22 and in each case information on the state (SF/SD) of the link 21 and, respectively, 22 leading to the relevant receiver from the optical receivers 15 and 19. Such information especially signals a reduced transmission quality or a failure of the relevant link. In addition, the monitoring device 16 outputs information on the K1 and K2 bytes to be sent out by the multiplexer 11 to the multiplexer 11.

In terminal 1, the switching device 13, which is a change-over switch and which can be controlled by the monitoring device 16, connects the further functional parts of the demultiplexer 12 to the operating link 21 in a first switching state, namely in the idle state, and to the standby link 22 in a second, activated switching state.

In terminal 3, the switching device 33, which is a change-over switch and which can be controlled by the monitoring device 36, connects the further functional parts of the demultiplexer 32 to the operating link 21 in a first switching state or idle state, respectively, and to the standby link 22 in a second, activated switching state.

Between the monitoring devices 16 and 36 of the two terminals 1 and 3, control information K1, K2 of the first and second type is exchanged via a system-inherent control channel. The change-over switch 13, 33 is in each case controlled by the local monitoring device 16, 36 in dependence on local control criteria and control criteria contained in the control information received from the distant station, in such a manner that the digital signals to be transmitted optionally pass via operating link 21 or standby link 22 to the receiving device or, respectively, to the further functional parts of the demultiplexer 12 and, respectively, 32.

The control information K1 of the first type contains an information item on the local control criteria. The control information K2 of the second type contains an information item on the state of the local change-over switch 13 or, respectively, 33.

The change-over switch 13 and, respectively, 33 is in each case controlled by a control signal which is derived from the local control criteria and from the control criteria contained in the control information K1 of the first type. When locally formed and received control information K2 of the second type do not match and the change-over switch 13, 33 is in the second state, the transmission device 16, 36 moves the change-over switch 13, 33 into the first idle state.

According to FIG. 1, the central monitoring device 16 causes the multiplexer 11 to send out corresponding K1 bytes and K2 bytes (K1/K2-T). As an alternative, the optical transmitter can send out the K1 bytes and K2 bytes instead of the multiplexer 11.

Figure 2:
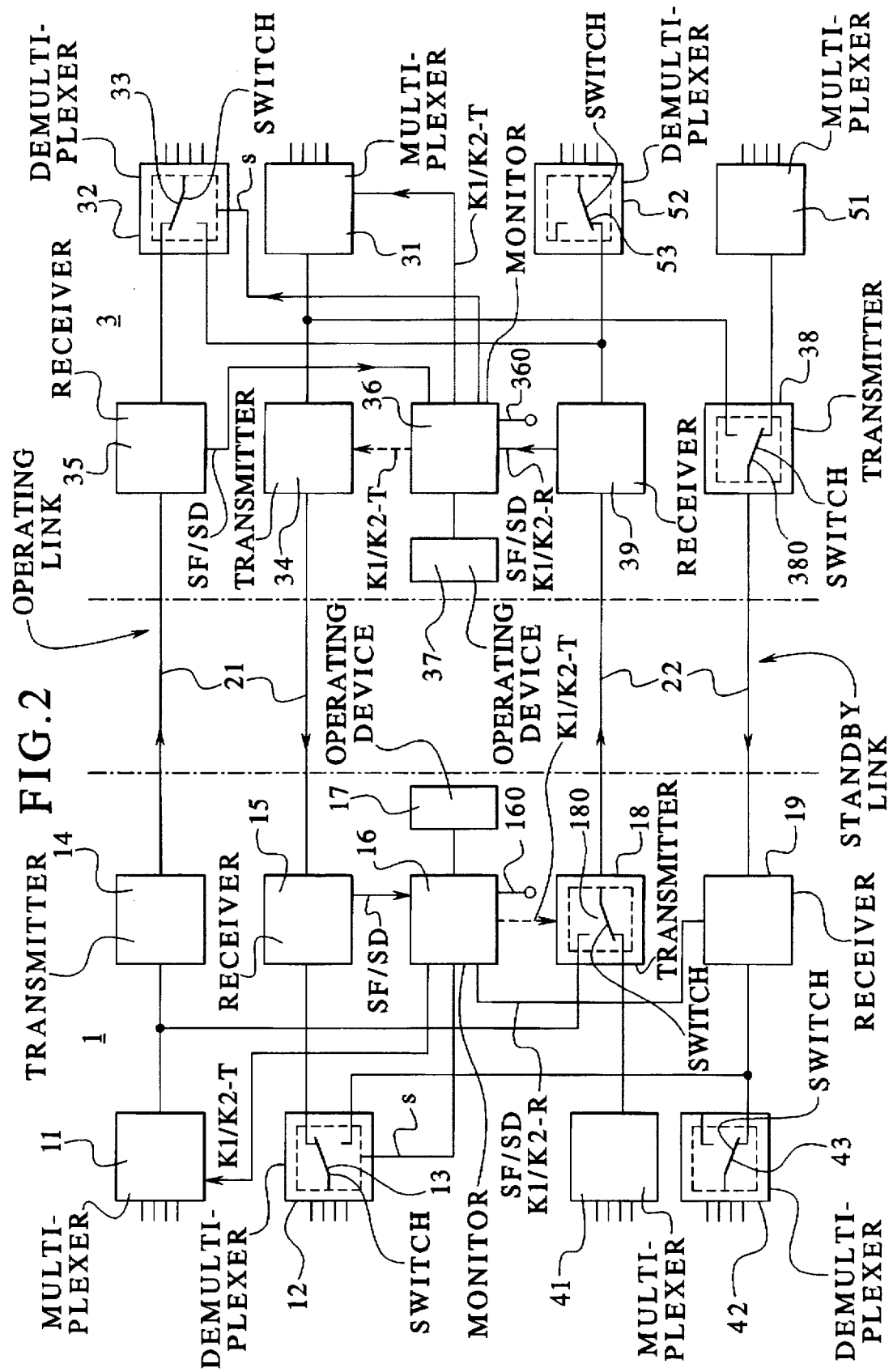
FIG. 2 shows a changeover device with an operating link and a standby link for 1:1 switch-over with optional transmission of information signals or further information signals via the standby link.

The switch-over device according to FIG. 2 largely corresponds to that according to FIG. 1. The difference consists in that the standby link 22 is available for a further transmission device if the standby link 22 is not needed as replacement for the operating link 21.

The further transmission device exhibits the multiplexer 41 and the demultiplexer 42 in terminal 1 and the multiplexer 51 and demultiplexer 52 in terminal 3. The optical transmitter 18 or, respectively, 38 of the standby link 22 is in each case provided at its input with a change-over switch 180 and, respectively, 380. With the aid of this change-over switch 180 or, respectively, 380, the further functional parts of the optical transmitter 18 or, respectively, 38 are optionally connected to the multiplexer 11 or, respectively, 31 or the multiplexer 41 or, respectively, 51. The demultiplexer 42 or, respectively, 52, can be optionally connected to the optical receiver 19 or, respectively, 39 of the standby link 22 with the aid of a switch 43, or, respectively, 53. The three switches 13, 180 and 43, on the one hand, and 33, 380 and 53, on the other hand, are in each case synchronously controlled by the relevant monitoring device 16 or, respectively, 36.

The changeover device according to FIG. 2 allows further digital signals to be transmitted via the standby link 22 as long as the standby link 22 is not needed as replacement for the operating link 21.

Figure 3:
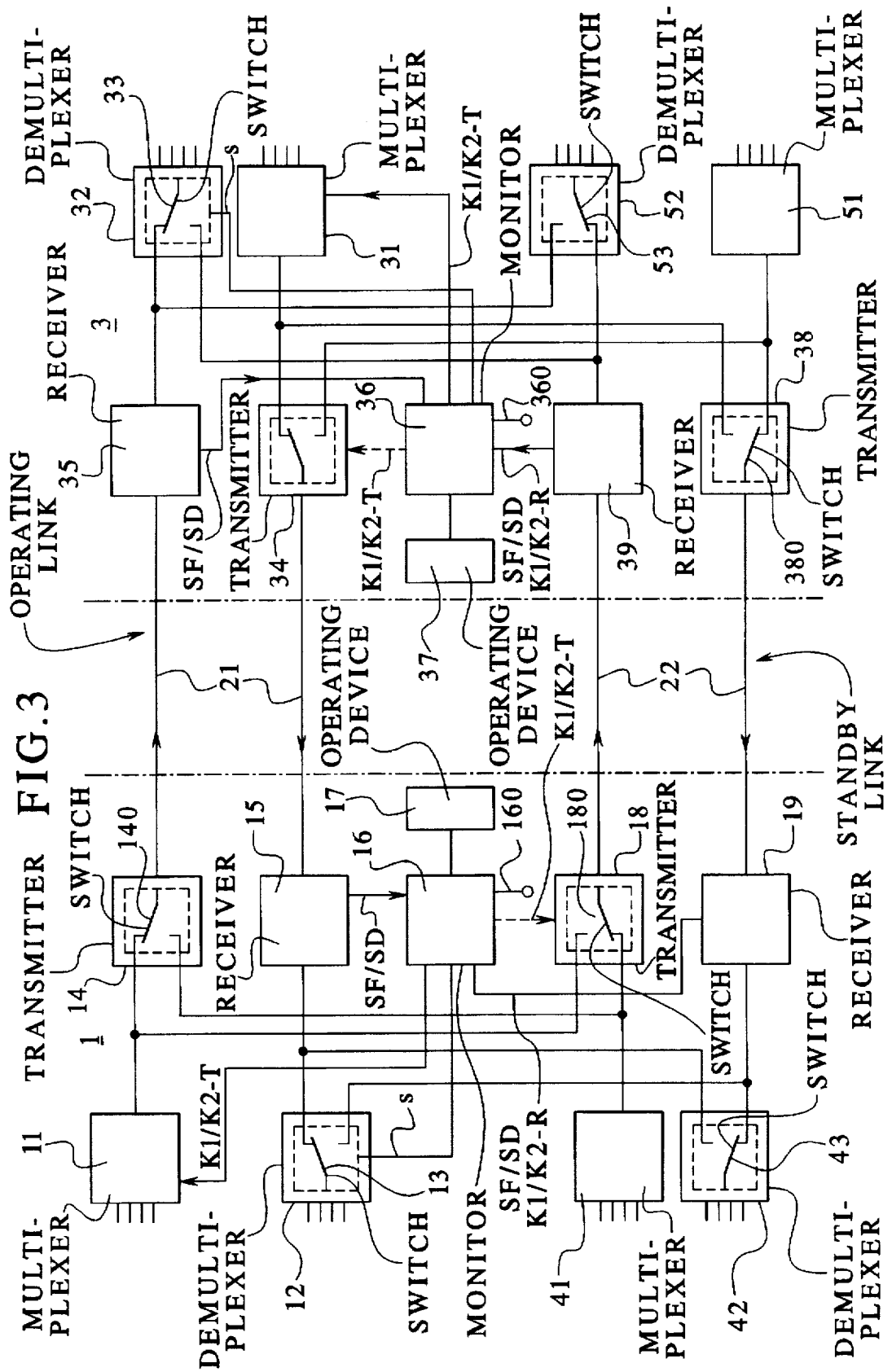
FIG. 3 shows a switch-over device for 1:1 switch-over according to FIG. 2, with transmission of further information signals optionally via the standby link or the operating link.

The changeover device according to FIG. 3 largely corresponds to that according to FIG. 2. The only deviation consists in that the optical transmitter 14 and, respectively, 34 of the operating link 21 exhibits at its input the change-over switch 140 and can be optionally connected to the multiplexer 11 or, respectively, 31 of the operating link 21 or to the output of the multiplexer 41 or, respectively, 51 of the standby link 22 with the aid of this change-over switch 140, and that the demultiplexer 42 and, respectively, 52 is optionally connected at its input to the optical receiver 19 or, respectively, 39 or to the optical receiver 15 or, respectively, 35 with the aid of the change-over switch 43 or, respectively, 53, the change-over switches 140, 13, 180 and 340, 43, 380 of the operating station 1, on the one hand, and the change-over switches 340, 33 of the operating station 3, on the other hand, in each case being jointly controllable by the monitoring device 16 and, respectively, 36.

The result is that additional information signals can be transmitted via the operating link 21 in the changeover case.

The transmission device for the bidirectional transmission of digital signals is especially a transmission device of the synchronous digital hierarchy as is known from CCITT Recommendations G.707 to G.709. In this case, the control information item of the first type is transmitted as K1 byte and the control information item of the second type is transmitted as K2 byte of the overhead. The K1 byte and the K2 byte are in this case transmitted in each signal frame, that is to say at time intervals of 125 μsec.

The transmission device for the bidirectional transmission of digital signals thus in each case contains a device for the periodic transmission of the control information K1, K2 of the first and second type at the transmitting end. At the receiving end, the monitoring device 16 or, respectively, 36 converts the periodically received control information into continuous signals.

At the signalling output 160 or, respectively, 360, the monitoring device 16, 36 outputs a message on the switching error found when locally formed and received control information K2 of the second type do not match and the changeover switch 13, 33 is in the second state, after a predetermined waiting time has elapsed. The predetermined waiting time is preferably about one second.

The first four bits of the K1 byte contain an information item on the state of the transmission link, the operating state of the changeover device or external control commands.

The K1 byte output always only specifies the local switching request. This is why no "return request" is specified in the K1 byte.

The first four bits of the K2 byte specify the status of the change-over switch 13 and, respectively, 33. This specifies the number of the link which is connected to the demultiplexer 12 via the change-over switch 13 or, respectively, 33.

The first four bits are "0001" if the change-over switch 13 or, respectively, 33 is in the idle position, and "0000" when the change-over switch 13 or, respectively, 33, is activated so that the demultiplexer receives information signals from the standby link 22.

The change-over switch is controlled by the request having the highest priority. This can be a local request or a remote request of the distant station received via the K1 byte. If a switching request of a particular priority determines the position of the change-over switch in one of the terminals 1 and 3 and if a further switching request of the same priority is added, for example from the distant station, this does not change the position of the change-over switch.

If the change-over switch is activated on the basis of a local or remote request in order to receive information signals from the standby channel, but the received K2 byte indicates for more than a predetermined waiting time of preferably about one second, that the change-over switch at the remote end is in its idle position, the change-over switch is brought into its idle position and mismatch is indicated at the signalling output 160 or, respectively, 360. The state of mismatch ends as soon as the local or remote request for switch-over to the standby link is cancelled or as soon as the change-over switch of the remote end is activated. If the standby link is in the "signal failure" state, the change-over switch is moved to idle position and the indication of mismatch is cancelled.

The following table shows an example of the changeover process for a bidirectional 1+1 switch-over in the no-return mode.

The table shows the K1 and K2 bytes which are transmitted in direction 3 to 1 from terminal 3 to terminal 1 and in direction 1 to 3 from terminal 1 to terminal 3. An "x" in each case specifies that the relevant bit is available for other uses. The fifth bit of the K2 byte is always set to "0" to indicate that this is a 1+1 changeover to standby.

| Step | Direction Byte K1 | 3, 1 Byte K2 | Direction Byte K1 | 1, 3 Byte K2 |
| --- | --- | --- | --- | --- |
| 1 | 00000000 | 00010xxx | 00000000 | 00010xxx |
| 2 | 11010001 | 00000xxx | 00000000 | 00010xxx |
| 3 | 11010001 | 00000xxx | 00010001 | 00000xxx |
| 4 | 00010001 | 00000xxx | 00010001 | 00000xxx |
| 5 | 10110000 | 00010xxx | 00010001 | 00000xxx |
| 6 | 10110000 | 00010xxx | 00000000 | 00010xxx |
| 7 | 00000000 | 00010xxx | 00000000 | 00010xxx |

The table is based on the following sequence.
Step 1:
Operating and standby link 21 and 22 are in order. Standby link is not being used. In terminals 1 and 3, the change-over switch 13 and, respectively 33 in each case connects the demultiplexer 12 and, respectively, 33 to the optical receiver 15 and, respectively, 35 of operating link 21.
Step 2:
The operating link 21 has failed in the direction from terminal 1 to terminal 3. This triggers a local switch-over request in terminal 3 and change-over switch 33 is activated so that it connects the optical receiver 39 to the multiplexer 32. The central monitoring device 36 causes the multiplexer 31 to output digital signals with updated K1 bytes and K2 bytes.
Step 3:
The switch-over request from the distant station 3 is received in terminal 1. The central monitoring device 16 activates the changeover switch 13 so that it connects the optical receiver 19 of the standby link 22 to the demultiplexer 12. In addition, the central monitoring device 16 causes the multiplexer 11 to output digital signals with updated K1 bytes and K2 bytes.
Step 4:
The operating link is repaired. The local switch-over request is cleared in terminal 3 and replaced by the input "no switching-back to the operating link". Terminal 3 sends updated K1 bytes.
Step 5:
The standby link exhibits a reduced transmission quality in the direction from terminal 1 to terminal 3. This triggers a local switch-over request in terminal 3. The change-over switch 33 is placed into the idle state in which the optical receiver 35 of the operating link 21 is connected to the demultiplexer 32. Terminal 3 sends digital signals with updated K1 bytes and K2 bytes.
Step 6:
The switch-over request from the distant station 3 is detected in terminal 1. The change-over switch 13 is placed in the idle state in which the optical receiver 15 of the operating link 21 is connected to the demultiplexer 12. The K1 bytes and K2 bytes of the transmitted digital signals are updated.
Step 7:
The standby link 22 is repaired. There is no further switch-over request in terminal 3. The central monitoring device 36 causes the multiplexer 31 to output updated K1 bytes.

The central monitoring devices 16 and 36 in each case contain a changeover logic. The changeover logic of each terminal 1 and 3, respectively, determines the active request having the highest priority. This can be a request of the distant station received via the K1 byte or a local request, especially an information item on the state of the transmission link, the operating state of the changeover device or an external control command. The changeover logic sets the change-over switch 13 or, respectively, 33 in correspondence with the request having the highest priority. The resultant position of the change-over switch 13 or, respectively is specified in the first four bits of the K2 byte sent out. To generate the K1 byte sent out, only the local request having the highest priority is taken into consideration. Requests from the distant station are not taken into consideration when generating the K1 byte. There is no acknowledgement of requests.

In the example shown in the table, a signal fault is found in operating channel 21 in terminal 3. In consequence, the changeover logic of terminal 3 activates the change-over switch 33 in such a manner that it receives information signals from the standby channel 22. In terminal 1, the changeover logic detects the fault via the received K1 byte and also activates its changeover switch 13. It inserts "no switching back" into the K1 byte sent out since no local requests are active.

After the operating channel 21 has been repaired, "no switching back" is specified in terminal 3 and the changeover switches 13 and 33 of terminal 1 and 3 remain activated. The device does not switch back to a preferred link as is the case when changing back. The input "no switching back" is eliminated if this is specified by a local request. If, following this, a signal fault on standby path 22 is found in terminal 3, this is therefore specified in the K1 byte sent out in terminal 3 and the changeover switch 33 of terminal 3 is moved to idle state. The switch-over logic of terminal 1 detects the fault via the received K1 byte and also moves its change-over switch 13 to the idle state.

After the standby link 22 has been repaired, "no request" is specified in both terminals 1 and 3.

For the change-back mode, "waiting for restoration" is specified instead of "no switching back" in terminal 3 after the operating link has been repaired. The input "waiting for restoration" is cleared and a "waiting for restoration" timer is deactivated when this is specified by a local request. If the "waiting for restoration" timer times out, both change-over switches 13 and 33 are moved to their idle state in order to receive information signals from the operating link 21. In both terminals, "no request" is specified.

The changeover method explained with reference to FIG. 1 is suitably also used in the manner described for the 1:1 switch-over devices according to FIG. 2 and FIG. 3, the switches being coupled together with the change-over switches of the same terminal and as always being operated synchronously with the change-over switch. Bit five of the K2 byte is always set to "1" in this case.

The following table shows a further example of the operation of the changeover device for 1+1 switch-over according to FIG. 1.

| Step | Direction 3, 1 Byte K1 | Byte K2 | Direction 1, 3 Byte K1 | Byte K2 |
|---|---|---|---|---|
| 1 | 00000000 | 00010xxx | 00000000 | 00010xxx |
| 2 | 10110001 | 00000xxx | 00000000 | 00010xxx |
| 3 | 10110001 | 00000xxx | 00000000 | 00000xxx |
| 4 | 10110001 | 00000xxx | 11100001 | 00000xxx |
| 5 | 10110001 | 00000xxx | 11100001 | 00000xxx |
| 6 | 10110001 | 00000xxx | 11100001 | 00010xxx |
| 7 | 10110001 | 00010xxx | 11100001 | 00010xxx |
| 8 | 10110001 | 00010xxx | 11100001 | 00000xxx |
| 9 | 10110001 | 00000xxx | 11100001 | 00000xxx |
| 10 | 10110001 | 00000xxx | 01100001 | 00000xxx |
| 11 | 10110001 | 00000xxx | 00000000 | 00000xxx |
| 12 | 01100001 | 00000xxx | 00000000 | 00000xxx |
| 13 | 00000000 | 00010xxx | 00000000 | 00000xxx |
| 14 | 00000000 | 00010xxx | 00000000 | 00010xxx |

The sequence of steps shown in the table is based on the following sequence.

Step 1:
Operation is faultless. Standby link 22 is not being used. In terminals 1 and 3, the change-over switch 13 and 33, respectively, is in its idle state in each case.

Step 2:
The operating link exhibits a reduced transmission quality in the direction from terminal 1 to terminal 3. This triggers a local switch-over request in terminal 3. The change-over switch 33 of terminal 3 is activated. The central monitoring device 36 causes the multiplexer 31 to output updated K1 bytes and K2 bytes.

Step 3:
The switch-over request from distant station 3 is detected in terminal 1. The change-over switch 13 is activated. The central monitoring device 16 updates the K2 byte.

Step 4:
A forced switch-over for the operating link is specified in terminal 1. The monitoring device 16 detects the higher priority of the local request. The position of change-over switch 13 is retained. The K1 byte is updated.

Step 5:
The higher priority of the remote request is detected in terminal 3. The position of change-over switch 33 is retained.

Step 6:
The standby link has failed in the direction from terminal 3 to terminal 1. This is detected by terminal 1 which switches the change-over switch 13 to its idle position. The K2 byte is updated. The K1 byte remains unchanged.

Step 7:
The existing switching fault is detected in terminal 3 by means of the first four bits of the received K2 byte and is signalled to the monitoring device 36 at output 360. The changeover switch 33 is moved to its idle state. The K2 byte is updated.

Step 8:
The standby link has been repaired. The end of the failure is detected in terminal 1. The change-over switch 13 is activated and the K2 byte is updated.

Step 9:
Terminal 3 detects the end of the switching fault, activates the changeover switch and updates the K2 byte.

Step 10:
The request for forced switch-over for the operating link is cleared in terminal 1. Terminal 1 detects the clearing of the local request and changes to the "waiting for switching-back to the operating link" state and updates the K1 byte.

Step 11:
The "waiting for switching-back" state is ended in terminal 1. There are no local requests in terminal 1. The K1 byte is updated.

Step 12:
The operating link has been repaired. Terminal 3 detects the clearing of the local request and changes to the "waiting for switching-back to the operating link" state and updates the K1 byte.

Step 13:
The "waiting for switching-back" state is ended in terminal 3. Terminal 3 is in the request-free state, changes the change-over switch 33 to its idle position and updates the K1 and K2 byte.

Step 14:
There is neither a local nor a remote request in terminal 1. The change-over switch 13 is moved to its idle state and the K2 byte is updated.

If a signal interruption occurs on the standby link 22, the changeover switch 13 or, respectively, 33 is moved to its idle state although a forced switch-over to the standby link is in effect.

In the example shown in the table, a transmission fault in operating link 21 is found in terminal 3. In consequence, the changeover logic contained in the monitoring device 36 of terminal 3 activates the changeover switch 33 in order to receive information signals from standby link 22. The changeover logic of the monitoring circuit 16 of terminal 1 detects the failure via the received K1 byte and also activates its associated changeover switch 13, but does not insert a request into the K1 byte sent out.

The forced switchover to the standby link which is then executed in terminal 1 is specified in the K1 byte sent out by terminal 1. It does not change the position of the changeover switch 13 or the K2 byte sent out.

If thereupon a signal failure of the standby link is detected in terminal 1, the changeover switch 13 in terminal 1 is moved to its idle position. This is specified in the K2 byte sent out. However, the K1 byte sent out still indicates the "forced switch-over" since this is of higher priority. This leads to the state of the switching fault which is detected in terminal 3. The changeover switch 33 of terminal 3 is moved to its idle position and the switching fault is signalled at output 360 of the monitoring device 36. The state of switching fault ends as soon as the standby link 22 has been repaired.

The example also shows the operation of the changeover device when the forced switchover is cancelled in terminal 1 and when the operating link 21 has been repaired. In the switching-back mode, when reception takes place from the standby link, the "waiting for switching-back" timer of a terminal is activated if no further local requests are in effect there. The input "waiting for switching-back" is cleared and the timer is deactivated if this is specified by local request. When the "waiting for switching-back" timer times out in terminal 3. "no request" is specified in both terminals 1 and 3 and both changeover switches 13 and 33 are moved to their idle state in order to receive information signals from the operating link 21.

A further case in which a switching fault can occur is that where local changeover to standby requests of the same priority but for different links occur quasi simultaneously in both terminals. The local requests initially result in different switch positions, i.e. a switching fault. Since additional switching requests of the same priority do not cause any change in the switch position, the switching fault initially persists even after the switching requests of the remote terminals have been received. However, the switching fault is eliminated by the fact that the switching fault is detected and the terminal receiving the information signal via the standby link switches to the operating link.

The central monitoring device 16 and, respectively, 33 can be constructed in each case in such a manner that it can optionally produce a bidirectional or a unidirectional 1+1 switchover. In the case of unidirectional switchover, the K1 byte is then suitably used for informing the other terminal about the local action. Bit five of the K2 byte is then set to zero. The first four bits of the K2 byte can be optionally used for informing the other terminal about the position of the changeover switch as in the bidirectional changeover to standby.

It requires only some small additions for adapting this protocol to bidirectional operation in the manner described. This is advantageous if it is intended to implement both unidirectional and bidirectional schemes.

In the illustrative embodiments shown in FIGS. 1 to 3, the central monitoring device 16 and 36, respectively, is in each case connected to the two optical receivers 15, 19 and, respectively, 35, 39 of the relevant operating station 1 or 3 which in each case contain a device for monitoring the transmission quality of the relevant link and signal a signal failure or a deterioration in the transmission quality to the central monitoring device 16 or 36, respectively. In deviation from this, it may be appropriate to use receivers without such monitoring devices and to obtain the said messages from the digital signals which are supplied to the demultiplexers 13, 43 and 32, 52, respectively.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for changeover to standby for a transmission device for bidirectional transmission of digital signals in which each of two terminals of a transmission section has a respective transmitting device and is connected to one another via an operating link and a standby link and contains a local monitoring device for detecting transmission faults, each of the two terminals having a switching device, which is controllable by a respective monitoring device, connecting a respective receiving device to the operating link in a first switching state and to the standby link in a second switching state, comprising the steps of:

exchanging control information of the first type and second type between the monitoring devices of the two terminals, the control information of the first type being sent out containing an information item on a local control criteria, and each of the switching devices being controllable by control signals by the respective local monitoring device in dependence on respective local control criteria and on control criteria contained in received control information such that digital signals are optionally passed to the respective receiving device via the operating link or the standby link;

treating both the local control criteria and the control criteria of a remote terminal contained in the received control information of the first type as equivalent switching requests by the monitoring device when the control signals are formed;

operating the respective switching device only in accordance with a switching request having a highest priority in that the sent out control information of the second type contains an information item on the state of the local switching device and in that the local switching device is placed in its first state by the monitoring device when a mismatch occurs between locally formed control information and received control information of the second type, and if the local switching device is in the second state.

2. A changeover device for a transmission device for bidirectional transmission of digital signals between two terminals of a transmission section, comprising:

a transmitting device in each terminal connected to one another via an operating link and a standby link;

a monitoring device in each terminal for detecting transmission faults;

a switching device in each terminal, which is controlled by the monitoring device;

a receiving device in each terminal, the switching device connecting the receiving device to the operating link in a first switching state and to the standby link in a second switching state;

control information of the first type and second type being exchangeable between the monitoring devices of the two terminals, sent out control information of the first type containing an information item on a local control criteria, each of the switching devices being controllable by control signals by the respective local monitoring device in dependence on local control criteria and on control criteria contained in the received control information, such that the digital signals pass optionally via the operating link or the standby link to the receiving device;

each of the monitoring devices being structured such that both the local control criteria and the control criteria of a remote terminal contained in the received control information of the first type are treated as equivalent switching requests when the control signals are formed and such that the respective switching device is only operated in accordance with a switching request having a highest priority;

the sent out control information of the second type containing an information item on the state of a respective local switching device; and each of the monitoring devices, for a mismatch between locally formed control information and received control information of the second type and with the respective local switching device being in its second state, placing the respective local switching device in the first state.

3. The changeover device as claimed in claim 2, wherein each of the terminals has, in addition to the switching device located at an input of the receiving device, a further switching device optionally connecting the standby link to an output of the transmitting device, and wherein the two switching devices of a common terminal are jointly controlled.

4. The changeover device as claimed in claim 3, wherein the further switching device is structured such that the standby link is optionally connected to the output of the transmitting device or to the output of a further transmitting device and wherein each of the terminals has a further receiving device and wherein an input of a respective further receiving device is optionally connected to the standby link via an additional switching device.

5. The changeover device as claimed in claim 2, wherein the transmission device for the bidirectional transmission of digital signals in each of the terminals has a device for periodic sending-out of the control information of the first type and second type at a transmitting end and a device for converting the periodically received control information into continuous signals at a receiving end.

6. The changeover device as claimed in claim 2, wherein the monitoring device, for a mismatch between locally formed control information and received control information of the second type and due to the switching device being in the second state, is structured to output a message on the switching fault detected in this manner and, after the switching fault has been eliminated, is structured to maintain the message for as long as the mismatch continues to exist.

7. The changeover device as claimed in claim 2, wherein the mismatch between locally formed control information and received control information of the second type is only detected after a predetermined waiting time has elapsed.

8. The changeover device as claimed in claim 2, wherein the transmission device for the bidirectional transmission of digital signals is a transmission device of a synchronous digital hierarchy, and wherein the control information of the first type is transmitted as a K1 byte of the overhead and the control information of the second type is transmitted as a K2 byte of the overhead.

9. The changeover device as claimed in claim 8, wherein the first four bits of the K1 byte contain an information item on a state of the transmission link, an operating state of the changeover device or external control commands, and the last four bits of the K1 byte contain an information item on an associated link.

10. The changeover device as claimed in claim 8, wherein the first four bits of the K2 byte contain an information item on a state of the switching device or the switching devices, respectively.

* * * * *